United States Patent [19]

Kolzer

[11] Patent Number: 5,391,424
[45] Date of Patent: Feb. 21, 1995

[54] LIGHTWEIGHT FILLER AND A PROCESS FOR ITS MANUFACTURE

[76] Inventor: Klaus Kolzer, Denrather Schlossufer 65b, D-4000 Dusseldorf 13, Germany

[21] Appl. No.: 830,014

[22] Filed: Feb. 3, 1992

[30] Foreign Application Priority Data

Feb. 5, 1991 [DE] Germany ............................ 4103351

[51] Int. Cl.$^6$ .................... B32B 7/02; B32B 5/16; B32B 7/12
[52] U.S. Cl. ............................... 428/220; 156/79; 427/180; 427/202; 427/389.8; 427/389.9; 427/394; 428/283; 428/308.4; 428/311.5; 428/317.5; 428/317.9; 428/319.3; 428/338; 428/402
[58] Field of Search ............... 428/338, 220, 283, 288, 428/308.4, 311.5, 317.5, 317.9, 319.3, 402; 156/79; 427/180, 202, 389.8, 389.9, 394

[56] References Cited

U.S. PATENT DOCUMENTS 3,676,288  7/1972  Hoyle .

OTHER PUBLICATIONS

Rompps Chemie–Lexikon, p. 1031, Franckh'sche Verlagshandlung, Stuttgart, Germany (1981).
Kunststoff–Lexikon, p. 114, Carl Hanser Verlag, Munich, Germany (1973).
Gerhard Wenske, Dictionary of Chemistry (English/German) Worterbuch Chemie (English/Deutsch) pp. 339 & 1400.
Chemical Abstracts 117(24): 235200.
Chemical Abstracts 110(20): 174420.
Chemical Abstracts 104(26): 226000.
Chemical Abstracts 78(10): 59449.

Primary Examiner—James C. Cannon
Attorney, Agent, or Firm—Sprung Horn Kramer & Woods

[57] ABSTRACT

A lightweight filler containing a non-woven fabric of substantially two-dimensionally oriented spun fibers which are loosened up and held together by microspheres of plastic material. For manufacturing the lightweight fillers, particles of the unexpanded first stage of microspheres in the form of an aqueous suspension are suspended in a two-dimensionally oriented spun non-woven fabric, the so-obtained material is dried and heated to a temperature necessary for expanding the particles and for the required period of time.

16 Claims, No Drawings

LIGHTWEIGHT FILLER AND A PROCESS FOR ITS MANUFACTURE

The invention relates to a lightweight filler for duroplastics, such as the classical thermosetting aminoplastics and phenoplastics, epoxy resins, polyurethane resins and other reaction resins.

To improve the use and strength characteristics of moldings made from such duroplastics, it is usual to reinforce the same with fibrous materials. To reduce the weight of plastic moldings without loss of mechanical strength and to decrease the proportion of resin as well as the specific weight while keeping the proportion of reinforcing fibers constant, one can replace part of the resin by so-called lightweight fillers.

DE-C-24 33 427 teaches the use of a bonded fibrous web containing 10 to 50 Vol. % of expanded so-called "microspheres" for the manufacture of molded fiber-reinforced articles of plastic material. Fibrous webs of the kind and their manufacture are described in U.S. Pat. No. 3,676,288. For manufacturing this voluminous non-woven material, a dispersion of a curable binder is sprayed on irregular and unoriented staple fibers, said dispersion containing particles of the unexpanded first stage of the microspheres. The thusly soaked fibrous web is dried and subsequently heated to a temperature which, on the one hand, is high enough to cure the binder and to expand the microspheres and, on the other hand, not so high as to break apart the microspheres due to the internal pressure.

In the so-obtained non-woven composite of high absorptive capacity for water, the proportion of binder is from 33.3 to 66.6% by weight, based on the microspheres.

A bonded non-woven fabric of polyester fibers and expanded microspheres of the kind serves according to DE-C-24 33 427 for manufacturing molded fiber-reinforced articles of plastic material and is commercially available in a similar form. The non-woven fabric of polyester fibers contains, for example, per 100 parts by weight of fibers, 30 parts by weight polyacrylonitrile as binder and 70 parts by weight microspheres. The voluminization of the starting material during the expansion of the microspheres is limited by the three-dimensionally arranged fibers, i.e. also perpendicular to the plane of the fibrous web. The initial thickness which depends on the technical production conditions is therefore about 50% of the final product.

The staple fibers of the three-dimensional irregular non-woven fabric are held together by the cured or cross-linked binder. The binder also fixes the microspheres onto the fibers. For this reason, this prior art lightweight material always has a certain rigidity even after the addition of the liquid resin-curing agent blend and with increasing material thickness a gradually poorer three-dimensional moldability. The structure of the bonded non-woven fabric together with the microspheres fixed therein remains substantially unaltered during the soaking with a liquid resin-curing agent blend and the molding into the shape of the desired article.

EP-A-102 335 describes a kraft or packing paper interspersed with microspheres. During the manufacture of said paper the particles of the still unexpanded first stage of microspheres are admixed to a conventional paper pulp for kraft and packing paper. The so-obtained fibrous web is processed on a paper machine and, after drying, is heated to 120° C. to expand the microspheres. In this intermediate product, the very short fibers are already held together by the resin glue or other conventional paper binders, which impart to said product a high bending strength and resistance to tearing, inspite of a density of only 250 kg/m$^3$. Therefore, this reinforcing material serves for the manufacture of a composite material with duroplastics.

The object of the present invention is to provide a lightweight filler comprising fibers and microspheres offering new possibilities in the manufacture of fiber-reinforced lightweight laminates and allowing the production of a novel primer.

In accordance with the one aspect of the invention there is provided a light weight filler comprising a non-woven fabric of substantially two-dimensionally oriented spun fibers that are separated by microspheres of plastic material and are held together by the microspheres. The microspheres are arranged predominantly between layers of the two-dimensionally oriented spun fibers.

A spun non-woven fabric suitable for the purposes of the invention (according to DIN 61210) is preferably formed directly from individual fibers of a length between 2 and 50 mm, in particular between 5 and 25 mm.

Staple fibers made of filament bundles cut to appropriate lengths which are usually used in the textile industry can also be employed. However, in the lightweight filler, the filaments are already separated to a large extent from each other and are interspersed by the microspheres. Care should be taken that the spun fibers are not impaired under the conventional conditions of the expanding process of the microspheres. This applies to most of the known textile fibers, such as natural fibers, synthetic fibers and other industrially manufactured fibers which, are described, for example, in RÖMMPS CHEMIELEXIKON 8th edition, 1988 under the keyword "Textilfasern" (textile fibers). Since the lightweight filler of the present invention is to be used in particular as core material of glass fiber-reinforced articles (GFR parts), the textile fibers conventionally used to this end are preferred. Particularly suitable fibers are polyester, polyamide or viscose staple fibers as well as carbonaceous, aramide, mineral or glass fibers. Since for most purposes, in particular for fibrous composites or glass fiber-reinforced plastics, the weight saving via the density of the fiber type is less decisive than via the reduction of the resin consumption, the lightweight filler of the present invention preferably contains mineral or glass fibers.

The arrangement of the spun fibers in the starting material is essential for the purposes of the invention, which remains substantially unaltered in the final product, the lightweight filler for duroplastics. The starting material is a non-woven fabric in which the spun fibers are substantially, and preferably exclusively two-dimensionally oriented, i.e. positioned in one plane. These oriented non-woven fabrics (cf. DIN 61210) may be longitudinal non-woven fabrics, transverse non-woven fabrics or irregular non-woven fabrics without perpendicularly arranged spun fibers.

The two-dimensionally oriented irregular non-woven fabric should not exhibit a major proportion of fibers which protrude from the fiber plane or are even perpendicular thereto because this could impair the voluminization during the expanding process. This is usually guaranteed, be it only for the reason that the thickness of the initial non-woven fabric is merely a fraction of the fiber length. Due to the two-dimensional configuration, the non-woven fabric is extremely thin and at a conventional weight per unit area of, for example, 50 g/m², has a material thickness of only 0.1 to 0.5 mm, preferably 0.2 to 0.3 mm.

Further aspects of the lightweight filler of the present invention will be illustrated by its manufacturing process. If the starting material is to be an unbonded non-woven fabric, the spun fibers are laid in two-dimensional arrangement on a continuous screen with the desired layer thickness or weight per unit area. The flat arrangement of these spun fibers can take place, e.g. in the dry form in that continuous fibers are converted to the desired length by a cutting tool. The addition of the unexpanded first stage of the microspheres on the dry fibers can be effected by spraying or rolling with rollers. In the wet process, the spun fibers are uniformly distributed in an aqueous dispersion of water and particles of the unexpanded first stage of microspheres and, as in the manufacture of paper, are laid in the wet condition on a screen.

In order to obtain the binder-free, and therefore susceptible, non-woven fabric as continuous web when the still unexpanded microspheres are incorporated and also during the subsequent drying and expanding process, a further continuous screen can additionally be provided from above until due to the action of temperature of from 90° to 150° C., the expanded thermoplastic microspheres from by virtue of their own surface adhesiveness a composite with each other and with the fibers. After cooling, a binder-free web-like non-woven fabric is formed having a tensile strength sufficient for winding up and further processing. The degree of bonding can be controlled via the temperature, i.e. by the control of the adhesiveness of the microspheres.

Another possibility of manufacturing the lightweight fillers of the present invention is to use as starting material the above-described two-dimensionally oriented spun non-woven fabric which is held together by a binder selected in a specific manner. Beside this chemical bonding on the basis of suitable binders, the starting web can be held together also by mechanical bonding, e.g. with water-insoluble fibers that melt in the expanding range of the microspheres which, consequently, do not impede the separation of the individual layers of the two-dimensionally oriented spun fibers. The advantage of using a prebonded two-dimensionally oriented non-woven fabric as starting material resides in the simpler production technique since the chemically or mechanically bonded non-woven fabrics do not need any additional guidance through rotating travelling screens.

The binder which is hardly soluble in water, preferably insoluble, has only the function of ensuring the tensile strength of the initial non-woven fabric necessary in the wet phase until the microspheres obtained during the expanding process take over the consolidation by thermal sintering with each other and with the fibers.

While the prior art, in particular U.S. Pat. No. 3,676,288 and DE-C-24 33 427, depart from the finding that the microspheres cannot bond the fibers and, therefore, considerable amounts of a cured binder are used to hold together these conventional three-dimensional irregular non-woven fabrics, the invention is based on the finding that the microspheres in the amounts of about 30–70%, based on the volume of the lightweight filler, can indeed hold together the spun fibers of the two-dimensional non-woven fabric until they are processed, i.e. until they are soaked with the still uncured duroplastic resin, in a completely satisfactory manner.

Microspheres of organic polymer are available with a thermoplastic shell of polyvinyl chloride or a vinylidene chloride-acrylonitrile copolymer, e.g. under the trade name Expancel®. The grain size is between 30 and 300 μm and the density amounts to about 20 to 40 kg/m³.

Also the unexpanded first stage of these hollow body fillers which is filled with an expanding agent, such as isobutane is commercially available. The unexpanded particles, e.g. "unexpanded" Expancel® or Folco-Microballons have particle sizes of from 5 to 10 μm. For expansion, they are subjected to temperatures of about 80° to 150° C. which correspond to the softening point of the shell material of the microspheres. As soon as the softening point is attained, the enclosed propellant gas expands the individual filler particles to a hollow sphere by vaporization.

The binder for the initial product, the two-dimensionally oriented spun non-woven fabric, must be difficult to dissolve or insoluble in water to ensure the necessary cohesion when the still unexpanded first stage of microspheres is incorporated as an aqueous binder-free suspension.

If the non-woven fabric consists only of individual fibers (elementary threads), it is sufficient to suspend the particles by passing the web of the two-dimensional non-woven fabric, for example, through a bath of the aqueous binder-free suspension of the hollow bodies'-first stage.

If the spun fibers consist of bundles of elementary threads, one of the measures described in EP-A-222 399, such as an intensive fulling process, the use of ultrasonic vibrations or the irradiation of the bonded non-woven fabric web with the suspension to separate elementary threads of the staple fibers from each other and to incorporate the small unexpanded particles of the unexpanded first stage therebetween. This is substantially easier with the starting material used according to the invention, even if the spun threads consist of bundles of elementary threads, than in the treatment of continuous fiber strands according to EP-A-222 399.

After incorporating the particles, the web of the two-dimensional laid product is stripped off with suitable means, e.g. rubber lips or nip rollers, in such a manner that just the desired amount of the unexpanded first stage remains in the two-dimensional non-woven fabric, which per unit area and in connection with the duration and intensity of the expanding process determines the thickness of the lightweight filler of the present invention.

When the water incorporated with the aqueous suspension of the unexpanded first stage of the microspheres is removed from the two-dimensionally oriented spun non-woven fabric together with the interspersed particles, an extremely thin material results. Therefore, the subsequent drying process takes place in a fraction of the time in which a corresponding amount of moisture can be removed from one of the prior art voluminous felt materials because the latter acts like an insulation, resulting in a prolongation of the drying and consequently of the production process.

In contrast to the prior art products, whose thickness is substantially predetermined after voluminization due to the material thickness of the raw felt and which can only be doubled or tripled because of the three-dimensional arrangement of the fibers, it is possible according to the invention, by virtue of the two-dimensional arrangement of the fibers, to increase the thickness of the starting material by 20 to 50 fold.

The binder also plays an important role as it must either escape or soften in order not to interfere with this "rising", as in the case of a puff paste. The process of voluminization according to the invention can also be compared with the rising of a mineral laminated material under the influence of water.

Suitable for the purposes of the invention are inter alia binders which evaporate, sublime or decompose under the conditions of the expanding process.

To obtain the necessary coherency during the incorporation of the unexpanded first stage of the microspheres into the two-dimensional laid product, it would suffice if the binder was limited to the points of intersection of the spun fibers. Therefore, very small amounts of the water-insoluble binder are sufficient.

Concentration of the binder at the points of intersection can be achieved by the correlating surface tension of the binder solution to the fibrous material. Binder amounts of 3 to 10% by weight, based on the fiber, are usually sufficient.

When the binder remains in the finished product, it is necessary that it softens during the expansion process in order not to impair the desired voluminization and the lifting of the superposed planes of spun threads from each other. Binder that softens during the expansion process is preferably a thermoplastic resin, e.g. a polyacrylate which softens in the temperature range in which the thermal voluminization of the microspheres takes place. Only if the fibers are separable from each other due to the softening of the binder, is an expansion of the microspheres and the entire flat-shaped article possible. Starting with this production phase, the thermoplastic microspheres themselves take over the hardening of the flat-shaped article by means of a kind of sintering and replace the starting binder material with respect to its action. Therefore, only very small amounts of the binder, e.g. 3–20, preferably 5–10% by weight, based on the weight of the mineral or glass fibers, are sufficient. The thermoplastics can be selected for specific purposes in such a manner that they can be partly or totally dissolved by the still uncured duroplastic resin during the processing of the lightweight filler for the manufacture of fiber-reinforced lightweight laminates. Many thermoplastics are soluble, e.g. in the styrene of the unsaturated polyester resins. The thermoplastic starting binder can also be selected in such a manner that it reacts to form a stable chemical compound with the impregnating resin, in that it is, for example, a prepolymer of the polyester resin.

The cohesion of the lightweight filler according to the invention entailed by the thermal sintering of the microspheres with each other and the with the fibers can be controlled by the height and the duration of the temperature during the expanding process. It can be adapted to the respective purpose. Usually, the mechanical cohesion can be controlled in such a manner that the lightweight filler retains its structure and a specific tensile strength after being impregnated with the resin so that it can be manipulated also in the impregnated condition when it is inserted and aligned in molds. After being inserted into the mold, a specific mechanical pressure of the laminating tools, e.g., of brushing rollers, disk rollers, or the like, should be sufficient to dissolve the structure and to convert the lightweight filler soaked with the resin into a plastic dough-like condition so that it can be placed without tension in complicated three-dimensional molds. This plastification process can, if necessary, be additionally improved or accelerated by a suitable solvent. A complete dissolution and plastification by mechanical action is particularly important when using the lightweight filler as primer in accordance with the invention.

The lightweight filler according to the invention is preferably used for manufacturing fiber-reinforced lightweight laminates and composites with suitable duroplastic resins. It is available to the processor in the form of roll-shaped webs.

In the manufacture of glass fiber-reinforced plastics, e.g., in hand laminates or also in the repair of wood or metal sheet articles or for filling cavities, suitable primers are necessary on a large scale which usually consist of a mixture of suitable duroplastic resins, fillers, thickening agents, coloring pigments etc. The fillers used therefor are mostly inorganic materials having a very high specific weight. For this reason, in case a specific field of application makes it necessary, microspheres are also used instead of the above-mentioned fillers since they considerably reduce the specific weight of such a primer.

However, the specific weight of the microspheres, which amounts to less than 10% of the specific weight of the resin used entails technical production and processing problems because, due to the extreme difference of the specific weights, segregation takes place shortly after mixing in that the microspheres rise, float on the surface and encrust. For this reason, one might not satisfactorily make use of the desirable properties of the microspheres for primers, all the more so since the long storage times of industrially produced primers are problematic.

If, nevertheless, a processor desires to process primers on the basis of microspheres, he is unable to do so without freshly mixing his primer each time he needs it. This process is time-consuming and requires appropriate processing apparatuses and is, therefore, used only to a small extent in practice.

The lightweight material according to the invention is exceptionally suitable for the preparation of a primer. It can be stored as long as necessary without changing its properties. To manufacture a primer, it is sufficient to mix cut out or pressed out rectangular or square chips having an edge length of from 1 to 5 cm or circular lamina of a similar diameter with a specific amount of resin. By simple mixing with a hand spatula or a suitable stirring apparatus, the laminar material is dissolved in a few seconds. By the mechanical action during the mixing of the resin, the short fibers and the microspheres are separated from each other and the structure is completely destroyed. A homogeneous, dough-like primer ready for processing is obtained. This process can additionally be improved by suitable solvents in the resin.

The short fibers themselves possess two important properties: They act as reinforcement in the produced primer and improve the stability characteristics and act as thixotropy agents. This effect is particularly important to prevent a segregation of resin and microspheres at least during the curing phase.

Since duroplastic resins are usually used, the curing takes place by adding suitable curing agents, such as organic peroxides. The curing agents can either be admixed to the resin previously or can already be added to the laminar-like dry primer during its manufacture. A processor can thus separately store the two components, namely the dry primer and the resin, as long as he wants.

The invention will be further described in the following illustrative example

EXAMPLE

The starting material is a spun-fiber non-woven fabric of two-dimensionlly oriented glass fibers trimmed to a length of approximately 12 to 15 mm and bonded together by a thermoplastic binder to render the fabric sufficiently tear resistant for processing. The fabric weighs approximately 100 g/m² and is approximately 0.2 mm thick. An approximately 10% aqueous solution of unexpanded hollow microspheres is rolled into the fabric and mostn of the water squeezed out between pairs of rollers. The still moist web of fabric with the uninflated microspheres blended into it is dried and heated to 150° C. to expand the thermoplastic microspheres. The thermoplastic walls of the microspheres soften and adhere to some extent to one another and to the fibers in the fabric. The fabric attains bulk due to expansion during the inflation process and attains a thickness of 5 mm. This duroplastic impregnates and inserts into a mold for manufacturing plastic parts. The bond between the hollow microspheres and the fibers dissolves with a little mechanical pressure, allowing a certain amount of plasticizing to occur on the part of the mixture, and it can be processed free of stress like a mass of dough, even in complicated shapes.

It will be appreciated that the instant specification and claims are set forth by way of illustration and not limitation, and that various modifications and changes may be made without departing from the spirit and scope of the present invention.

What is claimed is:

1. A lightweight filler comprising a non-woven fabric of substantially two-dimensionally oriented spun fibers which are loosened up and held together by expanded microspheres of plastic material.

2. A lightweight filler according to claim 1, wherein the spun fibers are individual fibers.

3. A lightweight material according to claim 1, wherein the spun fibers have lengths between 2 and 50 mm.

4. A lightweight filler according to claim 1, wherein the spun fibers were stable under those conditions which effected expansion of the microspheres.

5. A lightweight material according to claim 1, wherein the spun fibers are mineral fibers or glass fibers.

6. A lightweight filler according to claim 1, having a thickness of from 1 to 20 mm.

7. A lightweight material according to claim 1, wherein the microspheres have a diameter of between 30 to 300 $\mu$m.

8. A lightweight material according to claim 1, further containing a binder soluble in thermosetting resin with which the filler is subsequently impregnated.

9. A lightweight material according to claim 8, wherein the binder is a reaction component of a thermosetting resin with which the filler is subsequently impregnated.

10. A lightweight material according to claim 8, wherein the fibers are mineral or glass fibers and the binder is present in from 5 to 10% by weight of the mineral or glass fibers.

11. A lightweight filler according to claim 1, further containing a curing agent for a thermosetting resin with which the filler is subsequently impregnated.

12. A process for the production of a lightweight filler according to claim 1, comprising impregnating a non-woven fabric of substantially two-dimensionally oriented spun fibers with an aqueous suspension of expandable microspheres of plastic material, and subjecting the impregnated fabric to conditions under which the microspheres expand and adhere to the fibers.

13. A process according to claim 12, wherein prior to impregnation the spun fibers of the non-woven fabric are held together by a binder which is hardly soluble or insoluble in water.

14. A process according to claim 12, wherein the non-woven fabric has a thickness of from 0.1 to 1 mm.

15. A filler according to claim 1, which is in the form of chips or circular lamina subdivisions wherein the former have edge lengths and the latter diameters of from 1 to 5 cm.

16. A lightweight laminate comprising a thermoset resin reinforced with a lightweight filler according to claim 1.

* * * * *